United States Patent
Popovic

(10) Patent No.: US 6,549,564 B1
(45) Date of Patent: Apr. 15, 2003

(54) RANDOM ACCESS IN A MOBILE TELECOMMUNICATIONS SYSTEM

(75) Inventor: Branislav M. Popovic, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/288,747

(22) Filed: Apr. 8, 1999

(51) Int. Cl.[7] ............ H04B 15/00; H04K 1/00; H04L 27/30

(52) U.S. Cl. ............ 375/142; 375/146; 375/150; 375/343

(58) Field of Search .......... 375/130, 140–143, 375/145–147, 149, 150, 152, 367, 340, 343; 370/515, 503, 350, 335, 342, 441

(56) References Cited

U.S. PATENT DOCUMENTS

| | | | | |
|---|---|---|---|---|
| 4,943,982 A | * | 7/1990 | O'Neil, II et al. | 375/327 |
| 5,544,155 A | * | 8/1996 | Lucas et al. | 370/342 |
| 5,926,500 A | * | 7/1999 | Odenwalder | 375/144 |
| 5,946,359 A | * | 8/1999 | Tajiri et al. | 375/331 |
| 6,044,103 A | * | 3/2000 | Weaver, Jr. | 375/130 |
| 6,310,869 B1 | * | 10/2001 | Holtzman et al. | 370/335 |
| 6,324,227 B1 | * | 11/2001 | Kang et al. | 375/343 |

FOREIGN PATENT DOCUMENTS

| | | |
|---|---|---|
| WO | WO 97/46041 | 12/1997 |
| WO | WO 98/18280 | 4/1998 |
| WO | WO 98/49857 | 11/1998 |
| WO | WO 00/008908 | 2/2000 |

OTHER PUBLICATIONS

Yano Y et al., "Performance of DS/GMSK/PSK Modulation with Four–Phase Correlator and Its Application to Demodulator LSI", IEICE Trans. Fundamentals, vol. E79A, No. 12, Dec. 12, 1996, pp. 2062–2070.

TTA, "HPSK on PRACH", Tdoc SMG2 UMTS–L1 686/98, Espoo, Dec. 14–18, 1998.

Ericsson, "Performance evaluation of different random–access power ramping schemes", Tdoc SMG2 UMTS–L1, 670/98, Espoo, Dec. 14–18, 1998.

Motorola, "Peak–to–Average Power Reduction Method for the W–CDMA Reverse Link", Tdoc SMG2 31/98, Sophia Antipolis, Mar. 3–6, 1998.

Motorola and TTA, "Proposal for the UTRA L1 description, to be included in section 4.2.2.2.1", Tdoc SMG2 UMTS–L1 150/98.

A.J. Viterbi, CDMA Principles of Spread Spectrum Communications, Addison Wesley, 1995, pp. 26–32.

* cited by examiner

Primary Examiner—Phuong Phu
(74) Attorney, Agent, or Firm—Jenkens & Gilchrist, P.C.

(57) ABSTRACT

For one embodiment, a Random Access Channel (RACH) preamble modulation method and apparatus are disclosed in which the real and imaginary components of a complex RACH preamble are filtered in corresponding pulse shaping filters. Consequently, the phase transitions in the resulting signal are limited at all chip positions, and the resulting quadriphase codes produce transmitted signals with lower Peak-to-Average Power Ratios (PAPRs) than those that result using conventional Hybrid Phase-Shift Keying (HPSK) modulation schemes. On the other side, the resulting quadriphase synchronization code retains the same aperiodic autocorrelation magnitude as the original binary code, optimized to produce the minimum probability of incorrect synchronization.

34 Claims, 1 Drawing Sheet

RANDOM ACCESS IN A MOBILE TELECOMMUNICATIONS SYSTEM

CROSS-REFERENCES TO RELATED APPLICATIONS

This Application for Patent is related by subject matter to commonly-assigned for U.S. patent applications Ser. Nos. 08/733,501, 08/847,655, 09/148,224, 09/166,679 and 09/169,731, filed Oct. 18, 1996, Apr. 30, 1997, Sep. 4, 1998, Oct. 5, 1998, and Oct. 9, 1998, respectively, which are hereby incorporated by reference herein in their entirety.

BACKGROUND OF THE INVENTION

1. Technical Field of the Invention

The present invention relates in general to the mobile telecommunications field and, in particular, to a method and system for processing multiple random access mobile-originated calls.

2. Description of Related Art

The next generation of mobile communication systems will be required to provide a broad selection of telecommunication services including digital voice, video and data in packet and channel circuit-switched modes. As a result, the number of calls that will be made is expected to increase significantly, which will result in much higher traffic density on random access channels (RACHs). Unfortunately, this higher traffic density will also result in increased collisions and access failures. Consequently, the new generation of mobile communication systems will have to use much faster and flexible random access procedures preferably with reduced interference, in order to increase their access success rates and reduce their access request processing times.

In certain mobile communication systems, a mobile station can access a base station by first determining that the RACH is available for use. Then, the mobile station transmits a series of access request preambles (e.g., each of length 4096 chips) with increasing power levels, until the base station detects the access request. In response, the base station starts the process of controlling the mobile station's transmitted power via a downlink channel. Once the initial "handshaking" between the mobile station and base station has been completed, the mobile user transmits a random access message.

More specifically, in certain Code Division Multiple Access (CDMA) systems, a mobile station will attempt to access the base station receiver by using a "power ramping" process that increases the power level of each successive transmitted preamble symbol. As soon as an access request preamble is detected, the base station activates a closed loop power control circuit, which functions to control the mobile station's transmitted power level in order to keep the received signal power from the mobile station at a desired level. The mobile station then transmits its specific access request data. The base station's receiver "despreads" the received (spread spectrum) signals using a matched filter; and diversity-combines the despread signals to take advantage of antenna diversity.

In an IS-95 CDMA system, a similar random access technique is used. However, the primary difference between the IS-95 process and that of other CDMA systems is that an IS-95 mobile station transmits a complete random access packet instead of just the preamble. If the base station does not acknowledge the access request, the IS-95 mobile station re-transmits the access request packet at a higher power level. This process continues until the base station acknowledges the access request.

In a mobile communication system using a slotted ALOHA (S-ALOHA) random access scheme, such as the method disclosed in commonly-assigned U.S. patent application Ser. No. 08/733,501 (hereinafter, "the '501 Application"), a mobile station generates and transmits a random access packet. A diagram that illustrates a frame structure for such a random access packet is shown in FIG. 1. The exemplary random access packet ("access request data frame") comprises one or several preambles and a message portion. In general, the preamble is a binary synchronization code with optimized autocorrelation properties resulting in the minimized probability synchronization detection at incorrect time positions.

Returning to the problems to be addressed by the present invention, as described earlier, a mobile station transmits a random access burst to access a base station. The access burst includes a preamble and a message or data part. The message part is spread by a quadriphase spreading sequence, which is also modulated so as to reduce the Peak-to-Average Power Ratio (PAPR) of the filtered transmitted signal. This same type of modulation (commonly referred to as Hybrid Phase-Shift Keying or HPSK modulation) is applied on the uplink dedicated physical channel. An important advantage of such HPSK modulation is that it allows the design of a mobile station's power amplifier which can produce the maximum possible PAPR less 1 dB (as compared to conventional Quadrature PSK or QPSK modulation).

Alternatively, the preamble part of the transmitted random access burst is pseudo-QPSK modulated. As such, the preamble comprises a binary synchronization code that is 4096 chips long. In this case, each binary element of the code, C, is multiplied by a constant complex number:

$$C = \frac{(1+j)}{\sqrt{2}}, \quad j = \sqrt{-1}, \qquad (1)$$

just before filtering is applied in the quadrature transmitter branches. Consequently, the PAPR observed during the preamble's transmission is 1 dB higher than the PAPR observed during the transmission of the message part (i.e., during the traffic channel transmission). The problem with this 1 dB difference in PAPRs in a burst is that it distorts the transmitted signal, which typically causes interference in neighboring frequency channels. As such, this problem is especially critical at the higher power levels, which occurs more frequently during preamble power ramping. Again, preamble power ramping is the procedure whereby a mobile station transmits successive RACH preambles at increased power levels until the base station acknowledges that a transmitted preamble has been successfully received.

Notably, the conventional HPSK modulation approach used is to map a pair of binary spreading codes into a quadriphase spreading code so that the phase differences between some successive elements of the resulting quadriphase spreading code are at most plus or minus 90 degrees. As such, it should be stressed that the phase differences of only some of the successive elements of the quadriphase code are at most plus or minus 90 degrees, because a $\pi/2$ phase restriction applies only within the blocks of N=2 chips. However, the random QPSK transition is allowed between (as opposed to within) the blocks of N=2 chips. Consequently, such random phase transitions produce (virtually) statistically-independent binary spreading sequences on the I and Q channels, which is an important condition for improved immunity against interference with QPSK spreading. Namely, HPSK modulation is a hybrid combination of π/2-biphase (BPSK) and quadriphase (QPSK) spreading which utilizes the strengths of both methods. Specifically, π/2-BPSK spreading is directed to reducing the PAPR, while QPSK spreading is directed to reducing interference. Specifically, the inter-chip interference produced by the pulse shape filtering process is reduced by half. The other-user interference (conventional multiple access interference) is independent of the relative other-user carriers' phase.

FIG. 2 is a block diagram of a conventional HPSK modulator 100. As shown, the serial-to-parallel (S/P) conversion block 104 illustrates that the different random chips are multiplied (106) with the corresponding real and imaginary branches prior to summation (108), which produces random QPSK phase transitions after every N=2 chips. Consequently, the phase difference between the pairs of successive elements of the resulting quadriphase spreading code, $C_i+jC_q$, is limited to a value of at most $\pm\pi/2$. Every other phase transition can have any value within the set $\{0,\pm\pi/2,\pi\}$.

Nevertheless, a significant problem with the conventional HPSK modulation approach is that it alters the correlation properties of the spreading sequences being modulated. For example, when the spreading sequence is a specially-designed synchronization code with low aperiodic autocorrelation sidelobes, after HPSK modulation has been applied, there is no guarantee that the autocorrelation properties will remain the same. Quite the opposite, usually the fidelity of the autocorrelation properties becomes much worse in such cases. Actually, this problem is the main reason why HPSK modulation is not being applied to the RACH preamble in the conventional approaches. As such, it is desirable to provide a new modulation scheme that will limit phase transitions between successive quadriphase code elements, but will produce spreading/synchronization codes having unchanged correlation properties. As described in detail below, the present invention successfully resolves this problem and other related problems.

SUMMARY OF THE INVENTION

In accordance with a preferred embodiment of the present invention, a RACH preamble modulation method for a mobile communication system is provided in which the real and imaginary components of a complex RACH preamble are filtered in corresponding pulse shaping filters. Consequently, the phase transitions are limited at all chip positions, and the resulting quadriphase codes produce transmitted signals with lower PAPRs than those transmitted with conventional HPSK modulation schemes.

An important technical advantage of the present invention is that the modulation scheme used can be applied to arbitrary binary synchronization codes, providing at most plus or minus 90 degree phase transitions at all chip positions.

Another important technical advantage of the present invention is that the modulation scheme used results in more than a 2 dB PAPR reduction of the filtered transmitted signal as compared to conventional QPSK spreading schemes.

Yet another important technical advantage of the present invention is that the modulation scheme used provides a 1 dB lower PAPR than that obtained with conventional HPSK modulation schemes.

Still another important technical advantage of the present invention is that a modulation scheme is used which produces a quadriphase synchronization code that maintains the same aperiodic autocorrelation magnitude as the original binary code used, and is also optimized to produce a minimum probability of synchronization detection at incorrect time positions.

Still another important technical advantage of the present invention is that a synchronization code receiver can be implemented by using an efficient binary synchronization code correlator.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with a preferred embodiment of the present invention, a RACH preamble modulation method for a mobile communication system is provided whereby the real and imaginary components of a complex RACH preamble are filtered in corresponding pulse shaping filters. Consequently, the phase transitions are limited at all chip positions (within or between the chips), and the resulting quadriphase codes produce transmitted signals with lower PAPRs than those produced using conventional HPSK modulation schemes (e.g., 1 dB lower or more).

Figure 1:
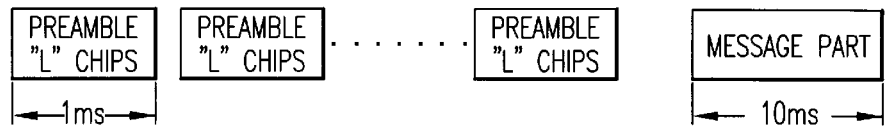
FIG. 1 is a diagram that illustrates a frame structure for a random access packet.
Figure 2:
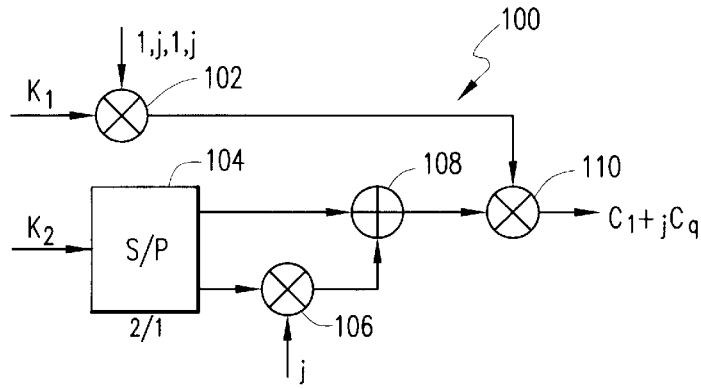
FIG. 2 is a block diagram of a conventional HPSK modulator.
Figure 3:
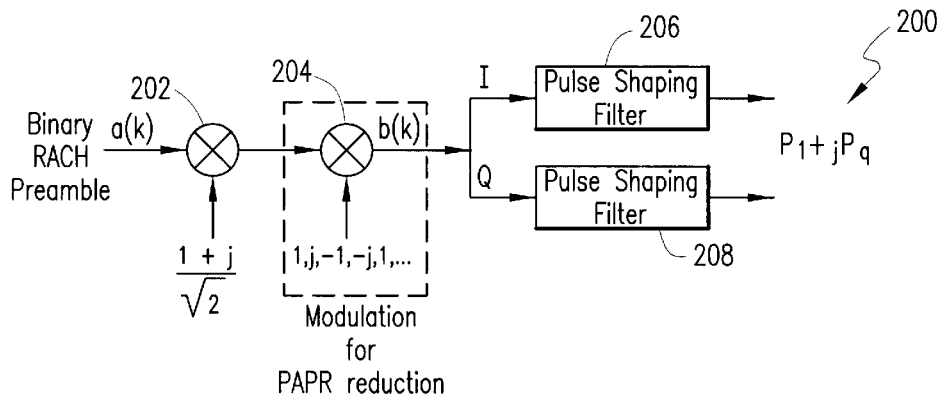
FIG. 3 is a block diagram of an exemplary baseband modulator for modulating a RACH preamble in a mobile communication system, which can be used to implement a preferred embodiment of the present invention.

Specifically, FIG. 3 is a block diagram of an exemplary baseband modulator 200 for modulating a RACH preamble in a mobile communication system, which can be used to implement a preferred embodiment of the present invention. For example, the exemplary modulator 200 shown can be used in any existing or future spread spectrum or CDMA mobile communication system. Referring to FIG. 3, a binary RACH preamble, a(k) (where k=0,1,2, . . . , L−1), of length L is first multiplied (202) by the constant complex number, $(1+j)/\sqrt{2}$. In accordance with the preferred embodiment, in order to reduce the PAPR, the result is multiplied (204) or modulated by the complex number, $j^k$ (where k=0,1,2,3, . . . , L−1) and $j=\sqrt{-1}$. The resulting quadriphase preamble, b(k), can be expressed as:

$$b(k) = a(k)e^{j(\frac{\pi}{4}+\frac{\pi}{2}k)}, \qquad (2)$$

where k=0,1,2,3, . . . , L−1. The real and imaginary components of the complex quadriphase preamble, b(k) in Equation (2), are coupled to respective pulse shaping filters 206 (I) and 208 (Q), which produce the modulated RACH preamble, $P_I+jP_Q$, on the I and Q branches for transmission preferably by a mobile station.

Figure 4:
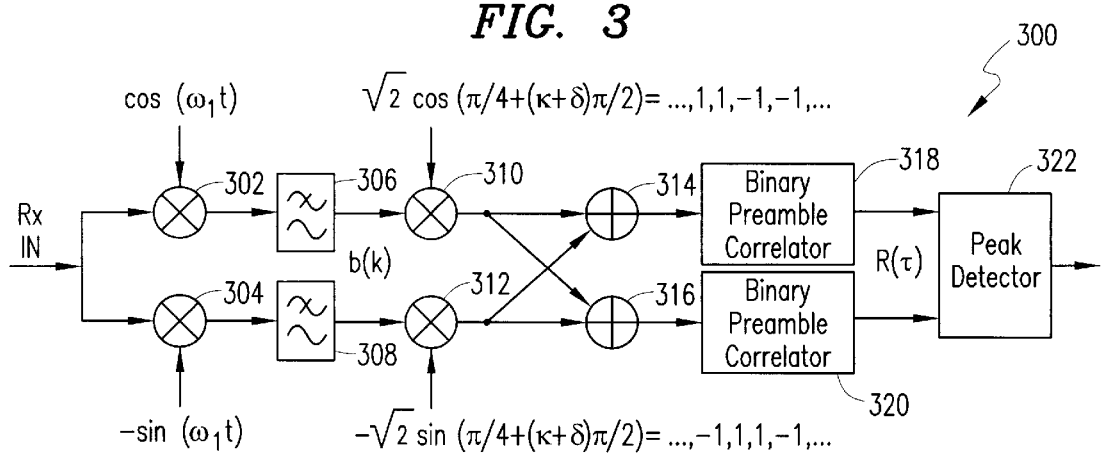
FIG. 4 is a block diagram of an exemplary RACH preamble receiver for receiving and demodulating a RACH preamble transmitted from a mobile station in a mobile communication system, which can be used to implement a second embodiment of the present invention.

FIG. 4 is a block diagram of an exemplary RACH preamble receiver 300 for receiving and demodulating a RACH preamble transmitted from a mobile station in a mobile communication system, which can be used to implement a second embodiment of the present invention. For example, the exemplary RACH preamble receiver 300 can be used to receive and demodulate the RACH preamble, $P_I+jP_Q$, as shown in FIG. 4.

Specifically, in the exemplary RACH preamble receiver 300, the received signal is down-converted to a complex baseband signal, by multiplying (302, 304) the received signal with a respective local oscillator signal component. The I and Q branches of the received baseband signal are then filtered by the corresponding pulse shaping filters (306, 308). The filtered components are then correlated by the complex conjugate of the transmitted complex preamble, {b(k)}.

When the received signal includes a transmitted RACH preamble, the output of the complex correlator (318, 320) is proportional to the aperiodic autocorrelation function, $R_b(\tau)$, of the complex sequence, {b(k)}, which can be expressed as:

$$R_b(\tau) = \sum_{k=0}^{L-1-\tau} b(k) \cdot b(k+\tau)^*, \quad (3)$$

for $0 \leq \tau < L$, and where $R_b(-\tau)=R_b(\tau)^*$. From Equations (2) and (3) above, it follows that:

$$R_b(\tau) = j^{-\tau} \sum_{k=0}^{L-1-\tau} a(k) \cdot a(k+\tau) = j^{-\tau} R_a(\tau). \quad (4)$$

From Equation (4), it can be seen that the quadriphase synchronization code maintains the same aperiodic autocorrelation magnitude as that of the original binary code. The aperiodic autocorrelation magnitude is the signal which is compared with a predefined threshold value in the peak detector 322. The peak detector 322 generates an output signal when the magnitude of the aperiodic autocorrelation signal is greater than or equal to the predefined threshold value. As illustrated above, the modulation approach used does not affect the preamble detection performance.

On the other hand, the complexity of the preamble receiver is increased to some extent by the additional multipliers 310, 312 and adders 314, 316, which are used to implement a phase "de-rotation" of the incoming received signal, as shown in FIG. 4. This phase "de-rotation" can be performed asynchronously with the incoming signal, by multiplying the incoming signal with the complex oscillator signal, $$e^{-j[\frac{\pi}{4}+\frac{\pi}{2}(k+\delta)]},$$

where δ is an arbitrary integer. The complex multiplication is performed by using real multiplication (310, 312) and real addition (314, 316). The "de-rotated" signals obtained after the real addition (314, 316) are coupled to a respective binary preamble correlator 318, 320.

The overall operation of the exemplary RACH preamble receiver 300 shown in FIG. 4 can be described by the following equation:

$$R(\tau) = \sum_{k=0}^{L-1-\tau} b(k) \cdot e^{-j[\frac{\pi}{4}+\frac{\pi}{2}(k+\delta)]} \cdot a(k+\tau) = e^{-j\frac{\pi}{2}\delta} \cdot R_a(\tau). \quad (5)$$

As illustrated by Equation (5), the primary effect of the asynchronism of the phase de-rotation is that the output complex correlation values are multiplied by a complex constant of unit magnitude. Consequently, the peak detector 322 is not influenced by such an asynchronous phase de-rotation of the incoming signal.

Furthermore, the estimation of initial channel coefficients for the RAKE demodulation of the RACH message part of the transmitted access burst can be performed in accordance with the conventional methods. Namely, the various multipath components of the received RACH preamble can (after despreading) be multiplied by the different complex constants resulting from the asynchronous phase de-rotation, but these components already may have different complex channel coefficients. Therefore, the channel coefficients which are to be used for RAKE demodulation can be obtained by selecting the real and imaginary parts of the corresponding correlation peaks that are output from the preamble correlator (e.g., 318, 320). As such, for the conventional (pseudo) QPSK-modulated RACH preamble, a measured PAPR is approximately 4.9 dB, while the PAPR derived from the modulation performed in accordance with the present invention is approximately 2 dB. Similarly, with conventional HPSK modulation applied to an arbitrary pair of binary sequences, the PAPR derived is approximately 3 dB. As such, in all of these cases, the evaluation can be performed by using the root raised-cosine pulse shaping I and Q filters with a roll-off factor α=0.22.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for modulating at least a portion of a synchronization signal in a mobile communication system, comprising the steps of:
   multiplying said at least a portion of said synchronization signal by a constant complex signal to produce a second complex signal;
   multiplying said second complex signal by a sequence of real and imaginary values to produce a phase rotation of said second complex signal; and
   filtering said phase rotation of said second complex signal.

2. The method of claim 1, wherein said phase rotation comprises a phase rotation in increments of π/2.

3. The method of claim 1, wherein said at least a portion of said synchronization signal comprises at least a portion of a random access signal.

4. The method of claim 3, wherein said at least a portion of said random access signal comprises a random access preamble.

5. The method of claim 3, wherein said at least a portion of said random access signal comprises a binary RACH preamble.

6. The method of claim 1, wherein said phase rotation of said second complex signal comprises a quadriphase preamble.

7. The method of claim 1, wherein said mobile communication system comprises a CDMA or spread spectrum system.

8. The method of claim 1, wherein said filtering step further comprises the step of filtering said phase rotation of said second complex signal with a respective I and Q branch pulse shaping filter.

9. The method of claim 1, wherein said method of modulating is performed at a mobile station.

10. A method for demodulating at least a portion of a synchronization signal in a mobile communication system, comprising the steps of:

down-converting said at least a portion of said synchronization signal to produce a plurality of real and imaginary components of a complex signal;

filtering said plurality of real and imaginary components of said complex signal to produce a second plurality of real and imaginary components of said complex signal;

phase de-rotating said second plurality of real and imaginary components of said complex signal to produce a plurality of phase de-rotated real and imaginary components of said complex signal; and correlating said plurality of phase de-rotated real and imaginary components of said complex signal with a complex conjugate of a transmitted complex preamble to produce a complex correlated signal.

11. The method of claim 10, further comprising the steps of:

comparing said complex correlated signal with a predefined threshold value; and outputting a detection signal if a value of said complex correlated signal is equal to or greater than said predefined threshold value.

12. The method of claim 10, wherein said at least a portion of said synchronization signal comprises at least a portion of a random access signal.

13. The method of claim 10, wherein said plurality of real and imaginary components of a complex signal comprises a respective I and Q branch of a complex baseband signal.

14. The method of claim 11, wherein a result of said outputting step indicates that a random access preamble has been detected.

15. The method of claim 10, wherein said demodulating method is performed at a base station receiver.

16. The method of claim 10, wherein said mobile communication system comprises a CDMA or spread spectrum system.

17. An apparatus for modulating at least a portion of a synchronization signal in a mobile communication system, comprising:

a first multiplier stage for multiplying said at least a portion of said synchronization signal by a constant complex signal to produce a second complex signal;

a second multiplier stage coupled to said first multiplier stage, for multiplying said second complex signal by a sequence of real and imaginary values to produce a phase rotation of said second complex signal; and a plurality of filters, each filter of said plurality of filters coupled to a respective multiplier component of said second multiplier stage, for filtering said phase rotation of said second complex signal.

18. The apparatus of claim 17, wherein said phase rotation comprises a phase rotation in increments of $\pi/2$.

19. The apparatus of claim 17, wherein said at least a portion of said synchronization signal comprises at least a portion of a random access signal.

20. The apparatus of claim 19, wherein said at least a portion of said random access signal comprises a random access preamble.

21. The apparatus of claim 19, wherein said at least a portion of said random access signal comprises a binary RACH preamble.

22. The apparatus of claim 17, wherein said phase rotation of said second complex signal comprises a quadriphase preamble.

23. The apparatus of claim 17, wherein said mobile communication system comprises a CDMA or spread spectrum system.

24. The apparatus of claim 17, wherein said plurality of filters comprise an I and Q branch pulse shaping filter.

25. The apparatus of claim 17, wherein said apparatus comprises a mobile station modulator.

26. An apparatus for demodulating at least a portion of a synchronization signal in a mobile communication system, comprising:

a down-converter stage for down-converting said at least a portion of said synchronization signal to produce a plurality of real and imaginary components of a complex signal;

a filter stage coupled to said down-converter stage, for filtering said plurality of real and imaginary components of said complex signal to produce a second plurality of real and imaginary components of said complex signal;

a phase de-rotation stage coupled to said filter stage, for phase de-rotating said second plurality of real and imaginary components of said complex signal to produce a plurality of phase de-rotated real and imaginary components of said complex signal; and a correlating stage coupled to said phase de-rotation stage, for correlating said plurality of phase de-rotated real and imaginary components of said complex signal with a complex conjugate of a transmitted complex preamble to produce a complex correlated signal.

27. The apparatus of claim 26, further comprising:

means, coupled to said correlating stage, for comparing said complex correlated signal with a predefined threshold value, and outputting a detection signal if a value of said complex correlated signal is equal to or greater than said predefined threshold value.

28. The apparatus of claim 26, wherein said plurality of real and imaginary components of a complex signal comprises a respective I and Q branch of a complex baseband signal.

29. The apparatus of claim 26, wherein said detection signal indicates that a random access preamble has been detected.

30. The apparatus of claim 26, wherein said demodulator is located at a base station receiver.

31. The apparatus of claim 26, wherein said mobile communication system comprises a CDMA or spread spectrum system.

32. The apparatus of claim 26, wherein said at least a portion of said synchronization signal comprises at least a portion of a random access signal.

33. In a radio communications system having a modulator unit and a demodulator unit, a method of modulating or demodulating at least a portion of a synchronization signal, the method comprising:

multiplying said at least a portion of said synchronization signal by a constant complex signal to produce a second complex signal;

multiplying said second complex signal by a sequence of real and imaginary values to produce a phase rotation of said second complex signal; and filtering said phase rotation of said second complex signal.

34. The method of claim 33, wherein the demodulator unit operates on a real-valued component-representative of the complex signal.

\* \* \* \* \*